United States Patent
Choi et al.

(10) Patent No.: US 9,870,709 B1
(45) Date of Patent: Jan. 16, 2018

(54) APPARATUS AND METHOD FOR DISPLAYING PARKING ZONE

(71) Applicant: HYUNDAI MOTOR COMPANY, Seoul (KR)

(72) Inventors: Jae Seob Choi, Suwon-si (KR); Kap Je Sung, Suwon-si (KR); Jun Hyung Kim, Suwon-si (KR); Joong Ryoul Lee, Incheon (KR); Jun Sik An, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/336,315

(22) Filed: Oct. 27, 2016

(30) Foreign Application Priority Data

Jun. 27, 2016 (KR) .................. 10-2016-0080424

(51) Int. Cl.
*B60Q 1/48* (2006.01)
*G08G 1/16* (2006.01)

(52) U.S. Cl.
CPC ................... *G08G 1/168* (2013.01)

(58) Field of Classification Search
CPC . B62D 15/027–15/0285; B62D 15/029; B62D 15/0295; B60W 30/06; G06K 9/00812; G08G 1/168; G08G 1/14–1/149
USPC .................. 340/932.2; 348/148, 149; 705/13
See application file for complete search history.

(56) References Cited

U.S. PATENT DOCUMENTS

| | | | |
|---|---|---|---|
| 7,969,326 B2* | 6/2011 | Sakakibara ........ | B62D 15/0275 340/932.2 |
| 2004/0201670 A1* | 10/2004 | Mizusawa .......... | B62D 15/0275 340/435 |
| 2006/0287826 A1* | 12/2006 | Shimizu ............. | B62D 15/0275 701/431 |
| 2008/0007618 A1* | 1/2008 | Yuasa .................. | B62D 15/027 348/118 |
| 2008/0158011 A1* | 7/2008 | Yamanaka ......... | B62D 15/0275 340/932.2 |
| 2011/0087406 A1* | 4/2011 | Barth ................... | B62D 15/027 701/41 |
| 2011/0216194 A1* | 9/2011 | Kosaki ..................... | H04N 7/18 348/148 |
| 2014/0139677 A1 | 5/2014 | Lambert et al. | |
| 2016/0280263 A1* | 9/2016 | Mori .................... | B62D 15/027 |

FOREIGN PATENT DOCUMENTS

| | | |
|---|---|---|
| JP | 2008-097448 A | 4/2008 |
| JP | 4670463 | 4/2011 |
| KR | 10-1251729 B | 4/2013 |
| KR | 10-2013-0050682 | 5/2013 |
| KR | 101449295 B | 10/2014 |
| KR | 10-2015-0116116 A | 10/2015 |

* cited by examiner

*Primary Examiner* — Thomas Mullen
(74) *Attorney, Agent, or Firm* — Brinks Gilson & Lione (57) ABSTRACT

An apparatus for displaying a parking zone may include: a parking zone display controlling unit configured to recognize parking zone lines from image data, to recognize a target parking zone in which a vehicle is to be parked among the parking zone lines on the basis of one or more of vehicle behavior information and the image data, and to correct the parking zone lines so that target parking zone lines in a non-display region are displayed; and a parking zone display unit configured to display the parking zone lines corrected by the parking zone display controlling unit.

17 Claims, 10 Drawing Sheets

APPARATUS AND METHOD FOR DISPLAYING PARKING ZONE

CROSS-REFERENCE TO RELATED APPLICATION

The present application claims the benefit of priority to Korean Patent Application No. 10-2016-0080424, filed on Jun. 27, 2016 in the Korean Intellectual Property Office, the entire disclosure of which is incorporated herein by reference.

TECHNICAL FIELD

The present disclosure relates to an apparatus and a method for displaying a parking zone, and more particularly, to a technology of supporting parking by providing a parking zone image extended and displayed up to a portion that is not viewed to a rear camera.

BACKGROUND

A vehicle driver may look into a side mirror and a rear-view mirror mounted on a vehicle or directly confirm a rear area of a vehicle with the naked eye in order to monitor objects at a rear of the vehicle at the time of parking the vehicle or when driving the vehicle in reverse.

However, since the side mirror has a semi-rectangular shape, there are a lot of dead zones that may not be recognized by the driver. In addition, there is a large limitation in confirming rear obstacle, particularly, an obstacle positioned at a short distance through the room mirror, such that the rear object is not accurately recognized, thereby often causing a fender-bender or a human accident.

To address the problems described above, a technology of installing a camera at the rear of the vehicle and providing a rear image of the vehicle onto a screen installed on a dashboard to allow the driver to perform an auxiliary role at the time of parking the vehicle and backward moving the vehicle has been developed. Recently, a technology of displaying a virtual parking guide line on a screen and displaying the virtual parking guide line so as to be bent depending on movement of the vehicle to assist in driving of the vehicle by the driver as well as simply displaying the rear image has been developed.

However, in the related art, only a parking zone line corresponding to a viewing field of a rear camera is displayed in an image, and a parking zone line of a region that is not displayed by the rear camera is not displayed, which is inconvenient.

SUMMARY

The present disclosure has been made to address the above-mentioned problems occurring in the prior art while advantages achieved by the prior art are maintained intact.

An aspect of the present disclosure provides an apparatus and a method for displaying a parking zone capable of displaying and providing a parking zone of a non-display region that is not displayed by a rear camera.

Objects of the present disclosure are not limited to the above-mentioned objects. That is, other objects that are not mentioned may be obviously understood by those skilled in the art from the following description.

In an exemplary form of the present disclosure, an apparatus for displaying a parking zone includes: a parking zone display controlling unit configured to recognize parking zone lines from image data, to recognize a target parking zone in which a vehicle is to be parked among the parking zone lines on the basis of one or more of vehicle behavior information and the image data, and to correct the parking zone lines so that target parking zone lines in non-display region are displayed; and a parting zone display unit configured to display the parking zone lines corrected by the parking zone display controlling unit.

The parking zone display controlling unit may include: a parting zone recognizing unit configured to recognize the parking zone lines in the image data; and a parking zone correcting unit configured to set a region of interest for a parking position among the recognized parking zone lines and to correct the recognized parking zone lines so that parking zone lines in the non-display region among the recognized parking zone lines are displayed on the basis of image information within the region of interest.

The parking zone correcting unit may include: a vehicle behavior based correcting unit configured to calculate vehicle behavior information, to change a position of the target parking zone corresponding to a space in which the vehicle is to be parked in the parking zone recognized in the parking zone recognizing unit on the basis of the vehicle behavior information, and to set the region of interest including the position of the target parking zone; and an image based correcting unit configured to detect feature lines within the region of interest and to extend and display parking zone lines of the target parking zone to and on the non-display region on the basis of the feature lines.

The vehicle movement-based correcting unit may set the region of interest to an entire parking zone or set the region of interest to be larger than the target parking zone.

The image-based correcting unit may be configured to detect straight lines among parking zone lines within the region of interest as the feature lines, to extend the feature lines to the non-display region, to detect intersection points at which extension lines meet each other, and to display extension lines up to an intersection point that is closest to the target parking zone among intersection points within the non-display region as the target parking zone.

The parking zone display unit may be configured to display the target parking zone by a first line and to display parking zone lines of a non-display region portion in the target parking zone by a second line.

The parking zone display unit may be configured to distinguish the first and second lines by making one or more of thicknesses, shapes, and colors of the first and second lines different from each other.

The parking zone display unit may be configured to display an entire parking zone in the corrected parking zone lines by a first line and to display the target parking zone by a second line distinguished from the first line by one or more of a color, a shape, and a thickness.

The parking zone display unit may be configured to display an entire parking zone including the target parking zone in the corrected parking zone lines by the same line.

The apparatus for displaying a parking zone may further include a target parking zone mode setting unit configured to decide a target parking zone mode on the basis of the image data or a user input.

In another exemplary form of the present disclosure, a method for displaying a parking zone includes: recognizing parking zone lines on the basis of image data; correcting the recognized parking zone lines so that parking zone lines in a non-display region among the recognized parking zone lines are displayed, using one or more of vehicle behavior information and the image data; and displaying the corrected parking zone lines.

In the recognizing of the parking zone lines, the parking zone lines may be recognized depending on one or more conditions of widths and angles of lines constituting the parking zone.

The correcting of the recognized parking zone lines may include: calculating a target parking zone in which a vehicle is to be parked on the basis of the vehicle behavior information; setting a region of interest including the target parking zone on the basis of the vehicle behavior information; detecting feature lines within the region of interest on the basis of the image data; extending the feature lines to a non-display region in the image data; and displaying the target parking zone in the non-display region using intersection points between the extended feature lines.

In the displaying of the target parking zone in the non-display region, extension lines up to an intersection point that is closest to the target parking zone among intersection points positioned in the non-display region among the intersection points between the extended feature lines may be displayed.

In the displaying of the corrected parking zone lines, all of the corrected parking zone lines may be displayed by the same line.

In the displaying of the corrected parking zone lines, an entire parking zone among the corrected parking zone lines may be displayed by a first line, and the target parking zone may be displayed by a second line distinguished from the first line.

In the displaying of the corrected parking zone lines, parking zone lines corresponding to the non-display region in the target parking zone may be displayed by a third line different from the second line.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary forms of the present disclosure will be described in detail with reference to the accompanying drawings. It is to be noted that in giving reference numerals to components of the accompanying drawings, the same components will be denoted by the same reference numerals even though they are illustrated in different drawings. Further, in describing exemplary forms of the present disclosure, well-known constructions or functions will not be described in detail in the case in which it is decided that they may unnecessarily obscure the understanding of exemplary forms of the present disclosure.

Terms 'first', 'second', A, B, (a), (b), and the like, will be used in describing components of exemplary forms of the present disclosure. These terms are used only in order to distinguish any component from other components, and features, sequences, or the like, of corresponding components are not limited by these terms. In addition, unless defined otherwise, all the terms used in the present specification, including technical and scientific terms, have the same meanings as meanings that are generally understood by those skilled in the art to which the present disclosure pertains. It should be interpreted that terms defined by a generally used dictionary are identical with the meanings within the context of the related art, and they should not be ideally or excessively formally interpreted unless the context clearly dictates otherwise.

Hereinafter, exemplary forms of the present disclosure will be described in detail with reference to FIGS. 1 to 8.

Figure 1:
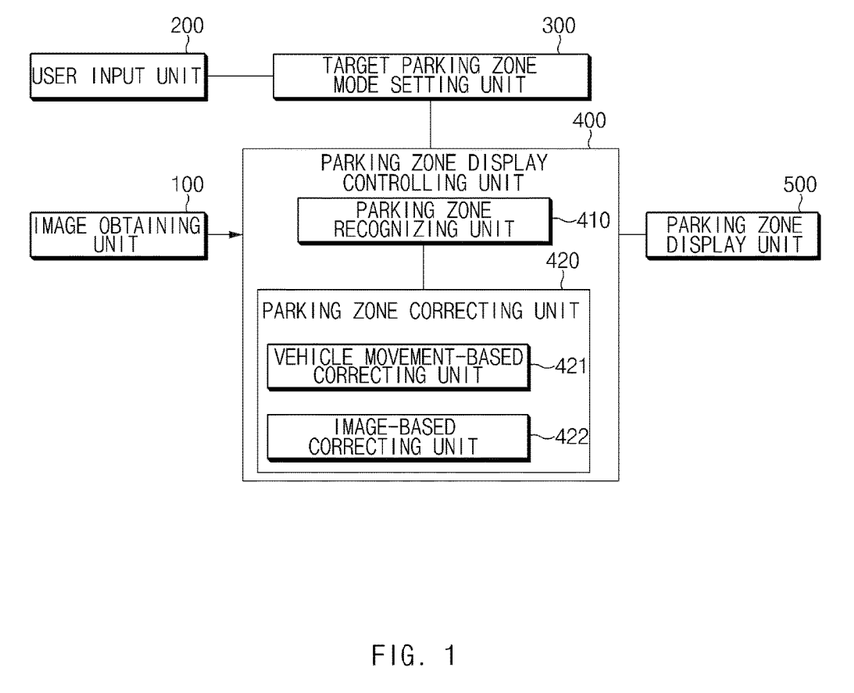
FIG. 1 is a block diagram illustrating an apparatus for displaying a parking zone.

FIG. 1 is a block diagram illustrating an apparatus for displaying a parking zone.

The apparatus for displaying a parking zone according includes an image obtaining unit 100, a user input unit 200, a target parking zone mode setting unit 300, a parking zone display controlling unit 400, and a parking zone display unit 500.

The image obtaining unit 100 obtains images of the front, the rear, the right, and the left of a vehicle. To this end, the image obtaining unit 100 may include a front camera, a rear camera, a right camera, and a left camera disposed outside the vehicle. In the present disclosure, a description will be provided on the basis of image data obtained from the rear camera as an exemplary embodiment related to parking.

The user input unit 200 receives one mode selected by a user among a target parking zone mode, a partial target parking zone mode, and an entire parking zone mode.

Figure 5:
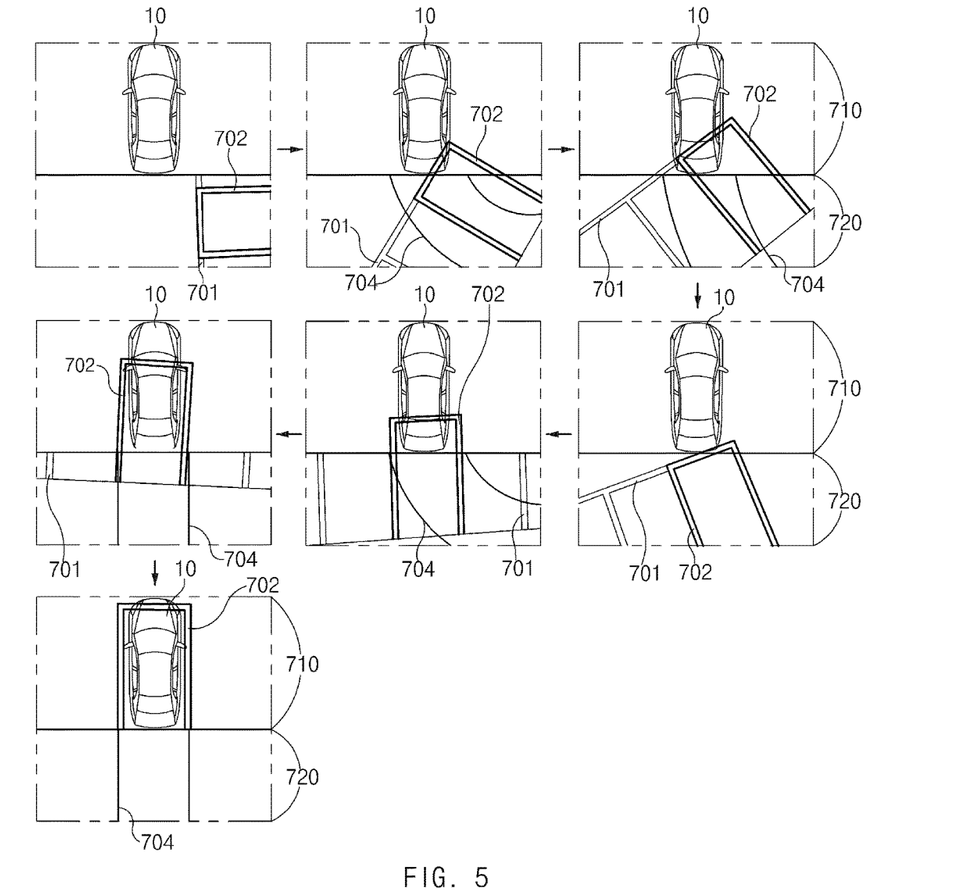
FIG. 5 is an illustrative view illustrating an example of displaying a target parking zone by a color different from that of an entire parking zone.
Figure 6:
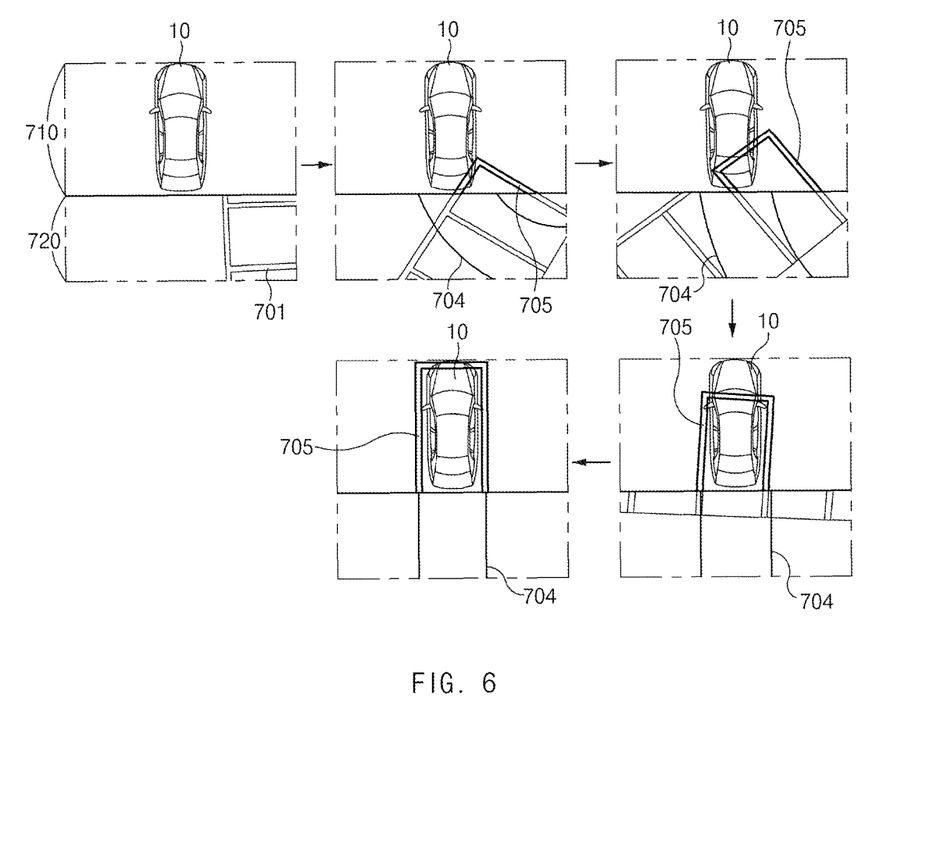
FIG. 6 is an illustrative view illustrating an example of displaying only a non-display region in a target parking zone by another color.
Figure 7:
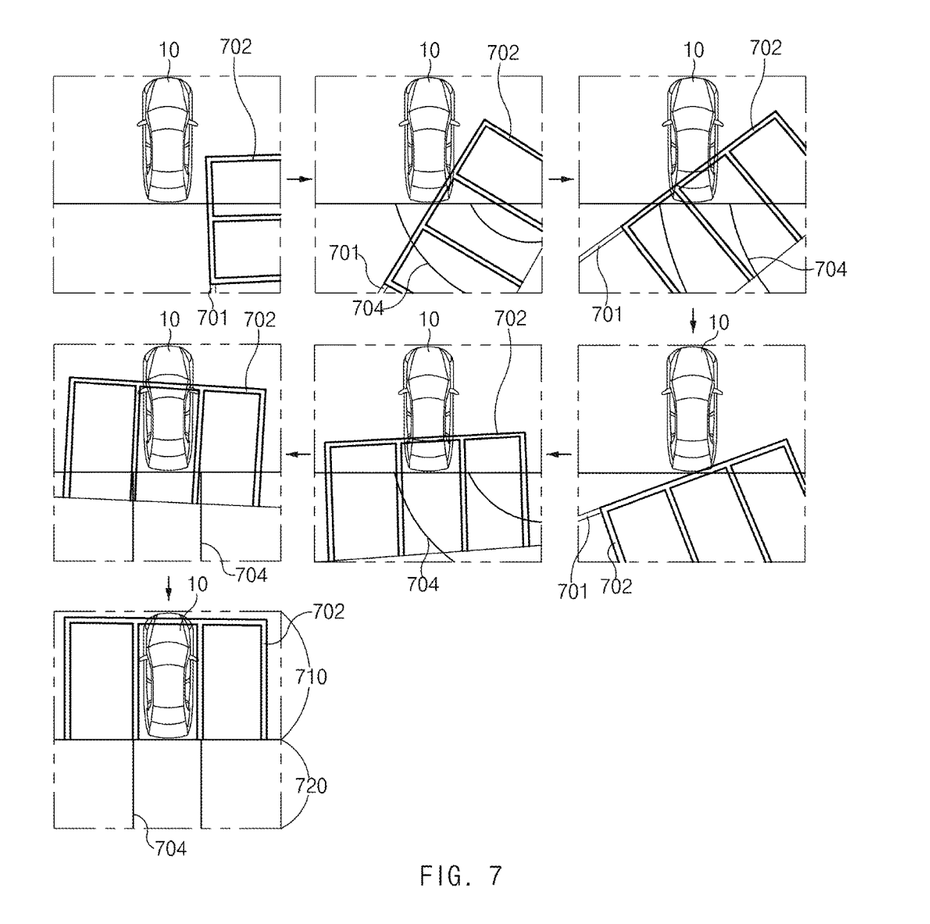
FIG. 7 is an illustrative view illustrating an example of displaying an entire parking zone, including a target parking zone by one color.

Here, the target parking zone mode, which is a mode of particularly emphasizing and displaying a target parking zone corresponding to a region within which the vehicle will be parked, may be a mode of displaying a target parking zone 702 within an entire parking zone 701 by a line, a shape, and a color different from those of the entire parking zone 701, as illustrated in FIG. 5, to allow the user to confirm the target parking zone at a glance. In addition, the partial target parking zone mode is a mode of emphasizing and displaying a target parking zone 702 of a non-display region 710, as illustrated in FIG. 6. Further, the entire parking zone mode is a mode of emphasizing and displaying the entirety of the entire parking zone 701, as illustrated in FIG. 7.

The target parking zone mode setting unit 300 selects one of the target parking zone mode, the partial target parking zone mode, and the entire parking zone mode on the basis of image data or sets one of the target parking zone mode, the partial target parking zone mode, and the entire parking zone mode to an input mode when one of the target parking zone mode, the partial target parking zone mode, and the entire parking zone mode is input from the user input unit 200.

The parking zone display controlling unit 400 recognizes parking zone lines from the image data, and corrects the parking zone lines so that parking zone lines of a non-display region in a target parking zone in which the vehicle is to be parked are displayed on the basis of one or more of vehicle movement information and the image data.

To this end, the parking zone display controlling unit 400 includes a parking zone recognizing unit 410 and a parking zone correcting unit 420.

The parking zone recognizing unit 410 recognizes an entire parking zone in the image data.

The parking zone correcting unit 420 sets a region of interest including a target parking zone in the recognized entire parking zone on the basis of the vehicle behavior information and performs correction so that parking zone lines of a non-display region are displayed on the basis of image information within the region of interest.

To this end, the parking zone correcting unit 420 includes a vehicle movement-based correcting unit 421 and an image-based correcting unit 422.

Figure 4A:
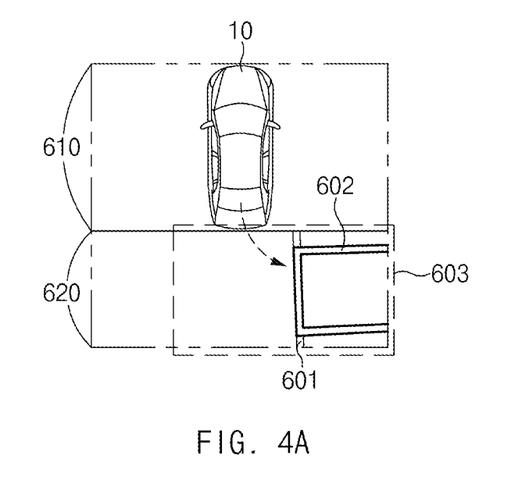
FIG. 4A is a view illustrating a vehicle movement-based target parking zone.
Figure 4B:
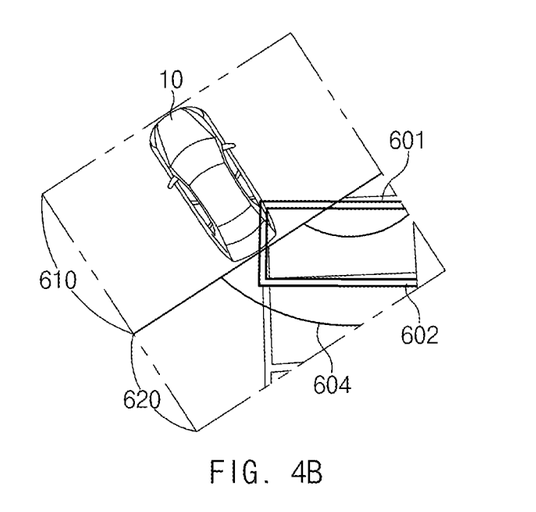
FIG. 4B is a view for describing a method for changing a vehicle behavior based target parking zone position of FIG. 4A.

The vehicle movement-based correcting unit 421 calculates a behavior path of the vehicle and calculates and displays a target parking zone as illustrated in FIG. 4A. Here, it may be appreciated that an error is generated between an entire parking zone 601 recognized by an image and a target parking zone 602 calculated on the basis of vehicle movement, as illustrated in FIG. 4B. This means a case in which an accumulative error is generated due to sliding of the vehicle during parking the vehicle, an inclination of a road, or the like.

Figure 4C:
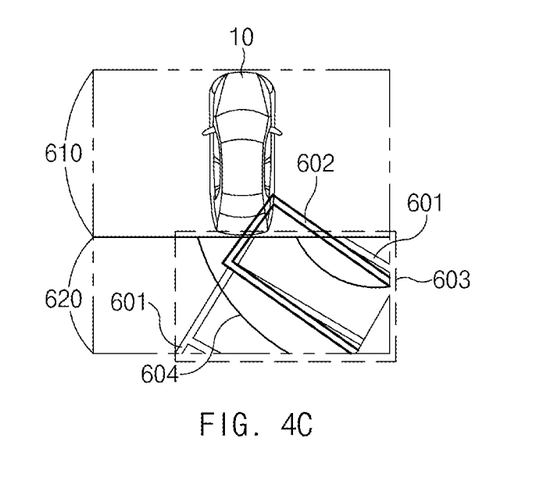
FIG. 4C is a view illustrating an example in which a region of interest is set in an image representing a parking zone.

In addition, the vehicle movement-based correcting unit 421 sets a region of interest (ROI) 603 including a path 604 through which the vehicle moves and the target parking zone 602, as illustrated in FIG. 4C. Here, the region of interest may be identified by a request of a user, or the like, and may be set to include an entire parking zone region or be set to an entire image screen.

Figure 4D:
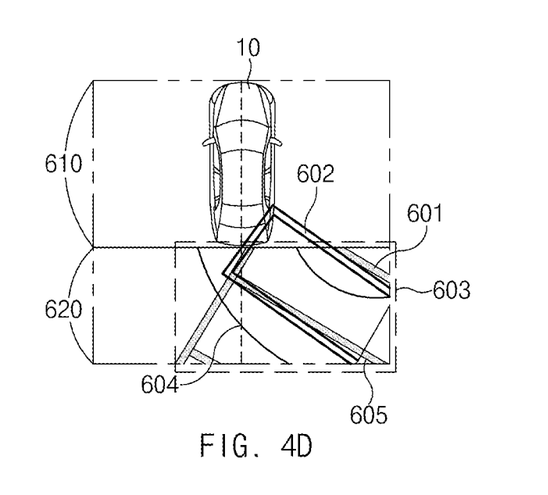
FIG. 4D is an illustrative view for describing a process of detecting a feature line.
Figure 4E:
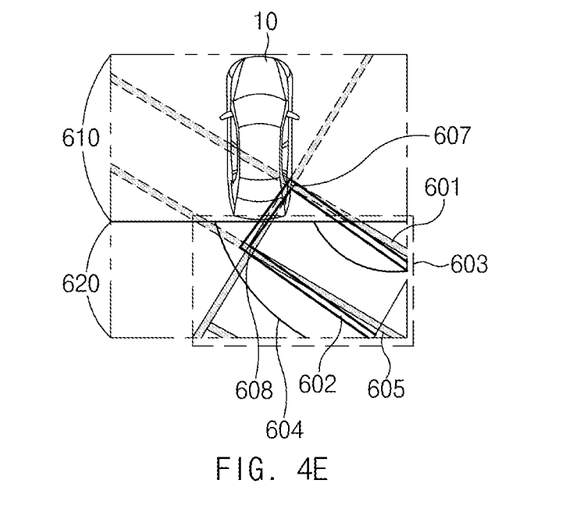
FIG. 4E is an illustrative view for describing a process of extending a feature line.

The image-based correcting unit 422 detects feature lines 605 within the region of interest in the image data, as illustrated in FIG. 4D. Here, the feature lines 605 include straight lines such as parking zone lines constituting the entire parking zone. Particularly, the feature lines 605 include straight lines that have an angle similar to that of the parking zone lines or are perpendicular to the parking zone lines. Various algorithms such as Hough transform, and the like, may be applied in order to detect the feature lines described above. In addition, the image-based correcting unit 422 extends the feature lines to a non-display region 610 and extracts intersection points 607 and 608, which are points at which the extended feature points intersect with each other, as illustrated in FIG. 4E. Then, the image-based correcting unit 422 displays extension lines up to an intersection point 607 that is closest to the target parking zone 602 among intersection points within the non-display region 610 as the target parking zone 602, as illustrated in FIG. 4F.

Figure 4F:
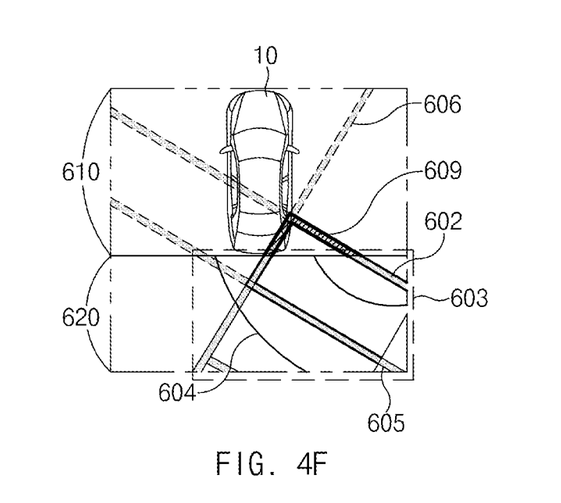
FIG. 4F is an illustrative view for describing a process of displaying a parking zone in a non-display region from an extension line.

That is, the image-based correcting unit 422 extends the target parking zone 602 to the intersection point 607 in the non-display region 610 to display an incomplete target parking zone 609, as illustrated in FIG. 4F. The image-based correcting unit 422 performs distance transform on the feature lines 605 and extension lines 606 to add and display the incomplete target parking zone 609 that was not viewed in the non-display region 610.

In FIGS. 4A to 4F, a reference numeral 610 identifies a non-display region that is not displayed by the rear camera, a reference numeral 620 identifies a region displayed by the rear camera, a reference numeral 601 identifies an entire parking zone, a reference numeral 602 identifies a target parking zone, a reference numeral 603 identifies a region of interest, a reference numeral 604 identifies a movement line corresponding to a path through which the vehicle behaves, a reference numeral 605 identifies a feature line, a reference numeral 606 identifies an extension line extended from the feature line, reference numerals 607 and 608 identifies intersection points, and a reference numeral 609 identifies an incomplete target parking zone of the non-display region 610.

The parking zone display unit 500 displays the parking zone lines corrected by the parking zone display controlling unit 400. Here, the parking zone display unit 500 may emphasize and display only the target parking zone as illustrated in FIG. 5, and display the target parking zone by one or more of a line shape, a color, and a thickness different from those of the entire parking zone in order to emphasize only the target parking zone. In addition, in the case in which the parking zone display unit 500 emphasizes and displays only a non-display region in the target parking zone as illustrated in FIG. 6, the parking zone display unit 500 may display an incomplete target parking zone 705 of the non-display region 710 by one or more of a line shape, a color, a thickness different from those of an entire parking zone 701. Further, the parking zone display unit 500 may emphasize and display the entire parking zone by one color, line shape, and thickness, as illustrated in FIG. 7. As illustrated in FIGS. 5 to 7, a screen provided by the apparatus for displaying a parking zone according to the present disclosure is divided into a display region 720 that is displayed by the rear camera and a non-display region 710 that is not displayed by the rear camera, and displays a movement line 704 corresponding to a path through which the vehicle 10 moves for being parked, the entire parking zone 701, the target parking zone 702, and the incomplete target parking zone 705 of the non-display region 710.

Figure 2:
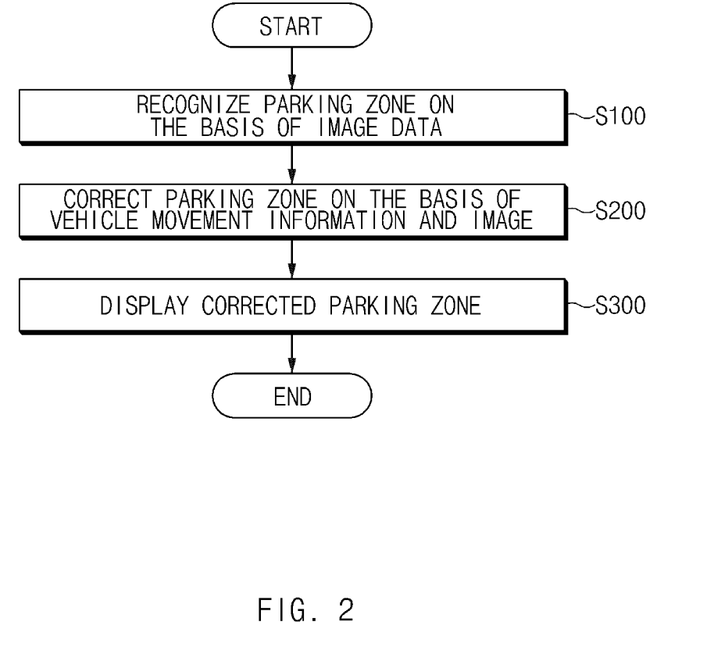
FIG. 2 is a flow chart illustrating a method for displaying a parking zone.

Hereinafter, a method for displaying a parking zone according to an exemplary embodiment in the present disclosure will be described in detail with reference to FIG. 2.

First, the parking zone recognizing unit 410 recognizes the parking zone lines on the basis of the image data obtained from the image obtaining unit 100 (S100). Here, the parking zone recognizing unit 410 may recognize the parking zone lines depending on one or more conditions of widths and angles of lines constituting the parking zone.

Then, the parking zone correcting unit 420 corrects the parking zone lines so that parking zone lines in the non-display region among the recognized parking zone lines are displayed using one or more of the vehicle movement information and the image data (S200). Here, the parking zone lines in the non-display region may be parking zone lines of a target parking zone in which the vehicle is to be parked.

Then, the parking zone display unit 500 displays the corrected parking zone lines (S300).

Figure 3:
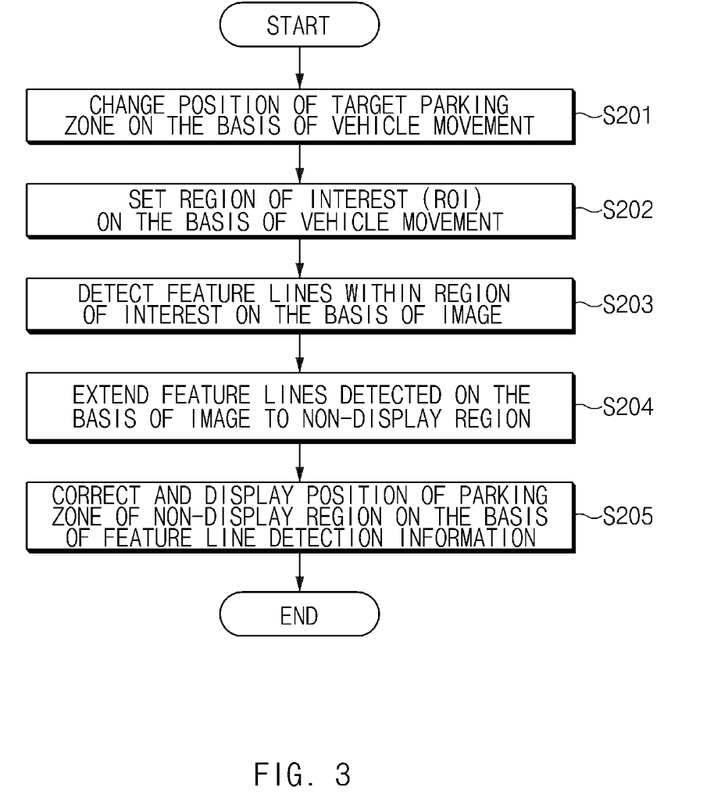
FIG. 3 is a flow chart illustrating a method for correcting a parking zone of FIG. 2 in detail.

Here, a method (S200) for correcting a parking zone of FIG. 2 will be described in detail with reference to FIG. 3.

First, the vehicle movement-based correcting unit 421 calculates the vehicle movement information and calculates the target parking zone on the basis of the vehicle movement information (S201). Referring to FIG. 4A, it may be appreciated that the target parking zone 602 is displayed.

Then, the vehicle movement-based correcting unit 421 sets a region of interest so as to include the target parking zone on the basis of the vehicle movement information (S202). Referring to FIG. 4C, it may be appreciated that the region of interest 603 is set and displayed.

Then, the image-based correcting unit 422 detects the feature lines within the region of interest on the basis of the image data (S203). Referring to FIG. 4D, it may be appreciated that straight lines such as parking zone lines are detected as the feature lines 605.

Then, the image-based correcting unit 422 extends the feature lines to the non-display region in the image data (S204). Referring to FIG. 4E, the image-based correcting unit 422 extends the feature lines 605 of the display region 620 to the non-display region 610 to display the extension lines 606.

Then, the image-based correcting unit 422 displays the target parking zone in the non-display region using the intersection points between the extension lines (S205). That is, as illustrated in FIG. 4F, the image-based correcting unit 422 detects the intersection points 607 and 608 positioned in the non-display region 610 and displays the extension line up to the intersection point that is closest to the target parking zone to allow the target parking zone to be displayed even in the non-display region.

As described above, in the present disclosure, the parking zone including the non-display region that is not viewed by the limited rear camera is displayed at the time of parking the vehicle, thereby making it possible to allow the user to more conveniently park the vehicle.

Figure 8:
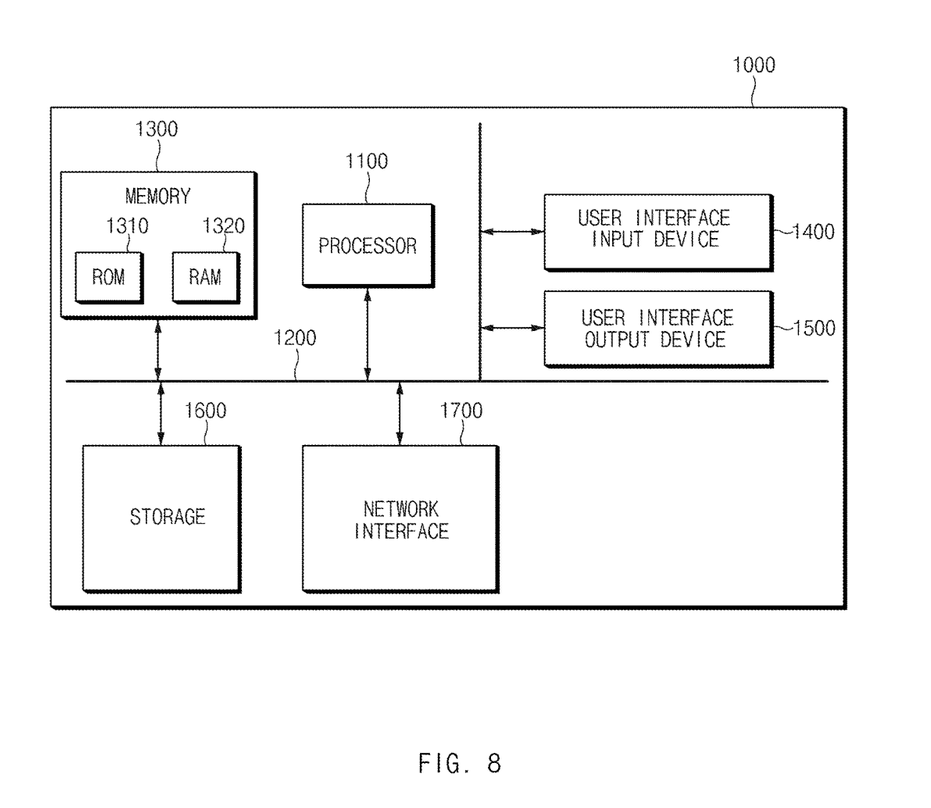
FIG. 8 is a block diagram illustrating a computer system for displaying a parking zone.

FIG. 8 is a block diagram illustrating a computer system to which a technology for displaying a parking zone is applied.

Referring to FIG. 8, the computer system 100 may include at least one processor 1100, a memory 1300, a user interface input device 1400, a user interface output device 1500, a storage 1600, and a network interface 1700 connected to each other through buses 1200. For example, the user interface input device 1400 may be the user input unit 200 shown in FIG. 1, and the user interface output device 1500 may be the parking zone display unit 500 shown in FIG. 1.

The processor 1100 may be a semiconductor device executing processing for instructions stored in a central processing unit (CPU) or the memory 1300 and/or the storage 1600. The memory 1300 and the storage 1600 may include various kinds of volatile or non-volatile storage media. For example, the memory 1300 may be a read only memory (ROM) and a random access memory (RAM).

Therefore, steps of a method or an algorithm described in association with exemplary embodiments disclosed in the present disclosure may be directly implemented by a hardware or software module executed by the processor 1100, or a combination thereof. The software module may reside in a random access memory (RAM), a flash memory, a read only memory (ROM), an erasable programming ROM (EPROM), an electrically erasable programmable ROM (EEPROM), a register, a hard disk, a detachable disk, a storage medium such as a compact disk-ROM (CD-ROM) (that is, the memory 1300 and/or the storage 1600).

An illustrative storage medium may be coupled to the processor 1100, which may read information from the storage medium and write information to the storage medium. As another method, the storage medium and the processor 1100 may also be formed integrally with each other. The processor and the storage medium may also reside in an application specific integrated circuit (ASIC). The ASIC may also reside in a user terminal. As another method, the processor and the storage medium may also reside as individual components in the user terminal.

As described above, according to the present technology, the parking zone of the non-display region that is not displayed by the rear camera is displayed and provided, thereby making it more convenient to the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for displaying a parking zone, comprising:
   a parking zone display controlling unit configured to recognize parking zone lines from image data depicting the parking zone, to recognize a target parking zone in which a vehicle is to be parked among the parking zone lines on the basis of one or more of vehicle movement information and the image data, and to correct the parking zone lines so that target parking zone lines in a non-display region are displayed; and
   a parking zone display unit configured to display the parking zone lines corrected by the parking zone display controlling unit.

2. The apparatus for displaying a parking zone according to claim 1, wherein the parking zone display controlling unit includes:
   a parking zone recognizing unit configured to recognize the parking zone lines in the image data; and
   a parking zone correcting unit configured to set a region of interest for a parking position among the recognized parking zone lines and to correct the recognized parking zone lines so that parking zone lines in the non-display region among the recognized parking zone lines are displayed on the basis of image information within the region of interest.

3. The apparatus for displaying a parking zone according to claim 2, wherein the parking zone correcting unit includes:
   a vehicle movement based correcting unit configured to calculate vehicle movement information, to change a position of the target parking zone corresponding to a space in which the vehicle is to be parked in the parking zone recognized in the parking zone recognizing unit on the basis of the vehicle movement information, and to set the region of interest including the position of the target parking zone; and
   an image-based correcting unit configured to detect feature lines within the region of interest and to extend and display parking zone lines of the target parking zone to and on the non-display region on the basis of the feature lines.

4. The apparatus for displaying a parking zone according to claim 3, wherein the vehicle movement-based correcting unit is configured to set the region of interest to an entire parking zone or to set the region of interest to be larger than the target parking zone.

5. The apparatus for displaying a parking zone according to claim 3, wherein the image based correcting unit is configured to detect straight lines among parking zone lines within the region of interest as the feature lines, to extend the feature lines to the non-display region, to detect intersection points at which extension lines meet each other, and to display extension lines up to an intersection point that is closest to the target parking zone among intersection points within the non-display region as the target parking zone.

6. The apparatus for displaying a parking zone according to claim 1, wherein the parking zone display unit is configured to display the target parking zone using at least a first line and to display parking zone lines of a non-display region portion in the target parking zone using at least a second line.

7. The apparatus for displaying a parking zone according to claim 6, wherein the parking zone display unit is configured to distinguish the first and second lines by making one or more of thicknesses, shapes, and colors of the first and second lines different from each other.

8. The apparatus for displaying a parking zone according to claim 1, wherein the parking zone display unit is configured to display an entire parking zone in the corrected parking zone lines using at least a first line and to display the target parking zone using at least a second line distinguished from the first line by one or more of a color, a shape, and a thickness.

9. The apparatus for displaying a parking zone according to claim 1, wherein the parking zone display unit is configured to display an entire parking zone including the corrected parking zone lines corresponding to the target parking zone.

10. The apparatus for displaying a parking zone according to claim 1, further comprising a target parking zone mode setting unit configured to decide a target parking zone mode on the basis of the image data or a user input.

11. A method for displaying a parking zone, comprising:
recognizing parking zone lines on the basis of image data;
correcting the recognized parking zone lines so that parking zone lines in a non-display region among the recognized parking zone lines are displayed, using one or more of vehicle movement information and the image data; and
displaying the corrected parking zone lines.

12. The method for displaying a parking zone according to claim 11, wherein in the recognizing of the parking zone lines, the parking zone lines are recognized depending on at least one of a width corresponding to the parking zone or an angle between two lines included in the parking zone.

13. The method for displaying a parking zone according to claim 11, wherein the correcting of the recognized parking zone lines includes:
calculating a target parking zone in which a vehicle is to be parked on the basis of the vehicle movement information;
setting a region of interest including the target parking zone on the basis of the vehicle movement information;
detecting feature lines within the region of interest on the basis of the image data;
extending the feature lines to a non-display region in the image data; and
displaying the target parking zone in the non-display region using intersection points between the extended feature lines.

14. The method for displaying a parking zone according to claim 13, wherein in the displaying of the target parking zone in the non-display region, extension lines up to an intersection point that is closest to the target parking zone among intersection points positioned in the non-display region among the intersection points between the extended feature lines are displayed.

15. The method for displaying a parking zone according to claim 11, wherein in the displaying of the corrected parking zone lines, all of the corrected parking zone lines are displayed using the same lines.

16. The method for displaying a parking zone according to claim 11, wherein in the displaying of the corrected parking zone lines, an entire parking zone among the corrected parking zone lines is displayed using at least a first line, and the target parking zone is displayed using at least a second line distinguished from the first line.

17. The method for displaying a parking zone according to claim 16, wherein in the displaying of the corrected parking zone lines, parking zone lines corresponding to the non-display region in the target parking zone are displayed using at least a third line different from the second line.

* * * * *